(12) United States Patent
Wharton et al.

(10) Patent No.: US 8,444,350 B2
(45) Date of Patent: May 21, 2013

(54) RESIN SYSTEM WITH CARBON ADDITIVE

(75) Inventors: Richard Wharton, Irvona, PA (US); Walter Neal Simmons, Durham, NC (US); John G. Oldsen, Butler, PA (US)

(73) Assignee: J-Lok Co., Pittsburgh, PA (US)

( * ) Notice: Subject to any disclaimer, the term of this patent is extended or adjusted under 35 U.S.C. 154(b) by 235 days.

(21) Appl. No.: 12/917,727

(22) Filed: Nov. 2, 2010

(65) Prior Publication Data

US 2011/0105696 A1     May 5, 2011

Related U.S. Application Data

(60) Provisional application No. 61/257,176, filed on Nov. 2, 2009.

(51) Int. Cl.
*E02D 7/00*     (2006.01)

(52) U.S. Cl.
USPC ............ 405/266; 523/130; 524/4; 524/5; 524/424; 524/906; 528/490; 156/327; 156/332; 405/267

(58) Field of Classification Search
USPC .......... 523/504, 505, 509, 511, 514, 515, 523/516, 521, 527, 130; 524/4, 5, 56, 57, 524/58, 906, 424; 156/327, 332, 336, 267; 528/490; 405/266, 267
See application file for complete search history.

(56) References Cited

U.S. PATENT DOCUMENTS

| | | | |
|---|---|---|---|
| 3,324,663 A | 6/1967 | McLean | |
| 4,103,771 A | 8/1978 | Klatt et al. | |
| 4,280,943 A | 7/1981 | Bivens et al. | |
| 6,545,068 B1 * | 4/2003 | Simmons et al. | 524/56 |
| 7,775,745 B2 | 8/2010 | Simmons et al. | |
| 2008/0221236 A1 | 9/2008 | Clingerman et al. | |
| 2009/0220767 A1 | 9/2009 | Schlogl et al. | |

OTHER PUBLICATIONS

Sweitzer et al., "Cure of Carbon Black-Unsaturated Polyester Mixtures", Industrial and Engineering Chemistry, Nov. 1995, 2380-2385, vol. 47, No. 11.

* cited by examiner

*Primary Examiner* — Robert Jones, Jr.
(74) *Attorney, Agent, or Firm* — The Webb Law Firm

(57) ABSTRACT

The gel time of a grouting system may be controlled by providing a resin component separated by a catalyst component, where a carbon component is included in the catalyst component. The catalyst component may include an inhibitor such as a phenolic compound, and/or the resin component may include a promoter such as an aniline compound.

19 Claims, No Drawings

RESIN SYSTEM WITH CARBON ADDITIVE

RELATED APPLICATION

This application claims the benefit of U.S. Provisional Patent Application No. 61/257,176 filed Nov. 2, 2009 entitled "Resin System With Carbon Additive", which is incorporated herein in its entirety by reference.

BACKGROUND OF THE INVENTION

1. Field of the Invention

The present invention relates to resin grouts for anchor systems and, particularly, to resin grouts for use in stabilization of reinforcement members, such as rock bolts or cable bolts (referred to herein collectively as either anchor bolts or reinforcement members), used in underground mining operations.

2. Description of Related Art

Currently available resin grout for anchoring reinforcement members in underground mines is typically provided in elongated dual compartment cartridges containing: (1) a curable polyester resin composition; and (2) a catalyst (for example, benzoyl peroxide). The cartridge is generally produced from a thin, rupturable film. After bore holes are drilled for anchor bolts, the cartridges are inserted into the blind end of the bore hole. When an anchor bolt is inserted into the bore hole and rotated, the cartridge ruptures so that the two components are mixed and a curing reaction begins. The gelling or setting time for the curing reaction typically varies from several seconds to many minutes. The anchor bolt is typically spun at a rotational speed of 100 revolutions/minute for between 3 and 10 seconds depending on the resin gel time (typically 20 to 60 revolutions).

As used herein, the terms "grouting," "grouting systems," "grout," and "grout system" mean a substance that hardens to anchor a reinforcing member in a space. For example, grouting can be provided in the form of a cartridge with a compartment housing a polyester resin and a compartment housing a catalyst, such that when the cartridge is shredded and the resin is mixed with the catalyst, a reinforcing member can be anchored in a space. By gel time, it is meant the time that elapses between mixing of the reactive components and the hardening or stiffening of the resin in the mixture, such as is defined in U.S. Pat. No. 4,280,943 to Bivens et al., incorporated herein by reference in its entirety. The gel time of the resin is known as the time for the resin to set up, e.g., typically from 10 seconds to 2 minutes, and, in the United States, typically either 10 seconds, 30 seconds, 60 seconds, or 120 seconds.

Typically, in the United States, resin grouts for mine roof reinforcement members are purchased in a pre-inhibited and/or pre-promoted condition. For example, the base resin typically may have a 20 minute gel time, which may be adjusted through the addition of inhibitors and promoters. In this manner, the polyester resins are purchased with a desired gel time that may be adjusted using inhibitors and promoters to slow down or speed up, respectively, the gel time. The gel time is shorter at higher temperatures and/or with higher promoter content, and vice versa.

The ASTM Designation F 432-04 entitled "Standard Specification for Roof and Rock Bolts and Accessories" provides a Speed Index for chemical grouting materials, which indicates the time from completion of mixing, until an anchorage level of 4000 lb. is achieved when tested according to the laboratory tests of the Standard. According to the Standard, grouting is identified in accordance with the Speed Index classification system in Table I below, where the Maximum Cure Time is to achieve a 4000 lb. test load.

TABLE I

| Speed Index | Maximum Cure Time (sec.) |
|---|---|
| 15 | 15 |
| 30 | 30 |
| 60 | 60 |
| 240 | 240 |
| 600 | 600 |
| 1000 | >600 |

In the United States, polyester resin is typically purchased from a manufacturer in a pre-promoted state. The acquired resin has a specific gel time which, subsequent to purchase, may be adjusted by the purchaser using promoters or inhibitors to speed up or slow down the gel time to meet desired needs. For example, a formulation designated Speed Index 240 would have a Maximum Cure Time of 240 seconds, but the purchaser can add a promoter to the formulation to change the Speed Index to 180, which corresponds to a Maximum Cure Time of 180 seconds. Such Speed Index adjustments (which generally correlates with gel time adjustments) using a promoter thus is done in a batch-wise fashion, requiring an entire batch of resin to be consumed before making an additional gel time change. Additionally, gel time may be dependent on the relative amounts of resin catalyst. As such, if there is higher catalyst content, the gel time is faster and, conversely, if there is less catalyst content, the gel time is slower.

The gel time of a resin grout may vary, e.g., from 10 seconds to 20 minutes. A mine operator typically needs resin grout that will gel in consistent time from one resin cartridge to another and at a time that is acceptable for the particular roof support plan. For example, the roof support plan may involve installing mine roof bolts spaced every four feet, completed within a certain length of time, meaning that the resin grout of each installed bolt must be fully gelled within a defined time period. As such, it may be necessary to control (adjust) the resin grout gel time. To adjust gel time for mine roof support grouting systems, therefore, it is known to inject promoter into the resin. It also is known to separately manufacture two different batches of resins, with each batch having a different gel time and separately pumping each of the two resins into a film cartridge so as to obtain a two-speed grouting system cartridge. In order to differentiate which end represents a particular resin speed, a dye is often included with at least one of the resins but, unfortunately, the resin is somewhat dark in color and, thus, the addition of the dye can be difficult to discern.

SUMMARY OF THE INVENTION

The present invention includes a mine reinforcement grouting system comprising a resin component and catalyst component separated from a resin component, wherein the catalyst component comprises a catalyst and a carbon component. Also included is a method of controlling gel time of a grouting system providing a resin component and catalyst component separated from the resin component and adding a carbon component to the catalyst component. In another embodiment, the present invention includes a method of stabilizing the gel time of a resin catalyst grouting system comprising a resin component separated from a catalyst component, wherein the catalyst component comprises a peroxide catalyst that generates free radicals and an inhibitor that inactivates free radicals generated by the peroxide catalyst, and wherein the catalyst component further comprises a stabilizer capable of further inactivating free radicals generated by the catalyst.

DETAILED DESCRIPTION OF THE INVENTION

Control of resin grout gel time has conventionally been accomplished using promoters or inhibitors in the resin component of polyester resin systems for mine roof supports. Both promoter and inhibitor can be added to the resin to adjust gel time. For example, in conventional resin grouting systems, a resin component containing a polymerizable polyester resin with cross-linking material is maintained separate from a catalyst component containing a peroxide catalyst in a two-compartment cartridge. Non-limiting examples of such catalysts include benzoyl peroxide (BPO), cyclohexone peroxide, hydroxyl heptyl peroxide, 1-hydroxy cyclohexyl hydroperoxide-1, t-butyl hydroperoxide, 2,4-dischlorobenzoyl peroxide and the like, methyl ethyl ketone peroxide, as well as inorganic peroxides alone or mixed with organic peroxides, such as sodium percarbonate, calcium peroxide, sodium peroxide. Promoters of the peroxide catalyst and/or inhibitors of polymerization may be added to the resin component. Typical promoters include, but are not limited to, aniline promoters, e.g., dimethyl-, diethyl-, or di-n-propylaniline. Suitable inhibitors conventionally include free radicals that would otherwise accelerate polymerization of the resin component and include, but are not limited to, phenolic compounds such as naphthoquinone (NQ) as well as hydroquinone, monoalkyl phenols, including monotertiary butyl phenol, monotertiary butyl hydroquinone, ortho-, meta-, and para-cresol, higher alkyl phenols, polyhydricphenols, including catechol, resorcinol, and the partially alkylated polyhydric phenols, including eugenol, guaiacol, and mixtures of these, as listed in U.S. Pat. No. 3,324,663 to McLean entitled "Rock Bolting," the entire content of which is incorporated herein by reference. As used herein, the term "catalyst" means a substance that initiates polymerization and, optionally, is consumed during polymerization. More recently, inhibitors have been added to the catalyst component, as disclosed in U.S. patent application Ser. No. 12/356,454, filed Jan. 20, 2009 entitled "Anchoring Systems and Methods of Use Thereof", incorporated by reference herein in its entirety.

The mine reinforcement grouting system of the present invention may be used with catalyst components containing an inhibitor (an inhibited catalyst) or not containing an inhibitor (an uninhibited catalyst), either of which may or may not include a promoter in the resin component or the catalyst component. However, it has been unexpectedly discovered that a stabilizer may further be included in the catalyst component of a two-component resin-catalyst mine reinforcement grouting system. By stabilizer it is meant a material capable of inactivating free radicals generated by the catalyst (and not inactivated by an inhibitor) and also capable of promoting activity of the catalyst. Suitable stabilizers are carbonaceous materials, referred to herein as a carbon component, such as carbon black, amorphous carbon and/or graphitic carbon, typically included in particulate form, sized 8 nm to 1000 nm. Carbon beads may be obtained from Cabot Corporation (Boston, Mass.) as Vulcan 72. Suitable graphite is available as Ecophit from SGL Group (Wiesbaden, Germany). The carbon component may be dispersed in a fluid (water or solvent) carrier. In one nonlimiting embodiment, the weight ratio of carbon component to catalyst is about 0.1-1 to 1000. Further stabilization of the catalyst may also be achieved by including black iron oxide (FeO). It has been found that the carbon component may function in a variety of modes, depending on the presence of promoters and inhibitors and amounts thereof.

A carbon component is believed to function as an inhibitor of catalytic activity (particularly for the resin/catalyst systems described herein), by absorption of free radicals onto at least the surface of the carbon particles. This inhibiting effect is expected to be particularly strong for diaroyl peroxides, such as benzoyl peroxide, because of their strong adsorption on carbon surfaces. It is believed that the carbon may act first as an inhibitor by absorption of peroxide on its surface, preventing and/or slowing reaction of peroxides with the resin. However, when a promoter is also present, particularly aniline promoters, the carbon also acts to absorb the promoter. The absorption of both peroxide and promoter on the carbon surface causes extremely rapid decomposition of the peroxide, producing a promoting effect. It can be seen by the proper adjustment of the amount of carbon, or promoter, an inhibition, promotion, or net zero effect can be produced.

Accordingly, in one embodiment of the invention, the mine reinforcement grouting system includes a resin component and a catalyst component separated from the resin component, where the catalyst component includes a catalyst and a carbon component. The catalyst component may further include an inhibitor or the resin component may include a promoter or both may be present.

For a catalyst component without an inhibitor, the carbon component is believed to absorb some of the peroxide and free radicals generated by the catalyst, thereby increasing the gel time of the grouting system. Similarly, when the resin component includes a relatively low amount of promoter, addition of a carbon component to a catalyst without an inhibitor serves to increase the gel time of the grouting system by absorbing some of the peroxide and free radicals generated by the catalyst.

This stabilizing effect of carbon has also been found for resin grouting systems having an inhibitor (e.g., napthoquinone or hydroquinone) in the catalyst component. The inhibitor generally serves to inactivate free radicals produced by the catalyst. Depending on the relative amount of promoter present, the carbon component may function as an inhibitor or as a promoter or have a near net zero effect or gel time as described above. In this manner, the gel time of a grouting system may be controlled by providing a resin component separated by a catalyst component, where the carbon component is included in the catalyst component. The amount of carbon component included in the catalyst component may be selected to substantially change the gel time. By substantially change, it is meant that the gel time is decreased or increased compared to the gel time of a grouting system not having the carbon component. The catalyst component may include an inhibitor such as a phenolic compound, and/or the resin component may include a promoter such as an aniline compound.

One additional benefit of the resin grouting system of the present invention is the color of the carbon in the catalyst component of typical two-compartment resin cartridges for mine roof reinforcement. The color can serve as an indicator that the system includes a gel time stabilizer.

The foregoing description sets forth the preferred embodiments of the invention at the present time. Various modifications, additions, and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

The invention claimed is:

1. A mine reinforcement grouting system comprising:
   a resin component; and
   a catalyst component separated from said resin component, said catalyst component comprising (i) a catalyst and (ii) a carbon component,
   wherein the carbon component to catalyst ratio is about 0.1-1 to 1000 by weight in the catalyst component.

2. The grouting system of claim 1, wherein said catalyst component further comprises an inhibitor.

3. The grouting system of claim 1, wherein said catalyst component further comprises a promoter.

4. The grouting system of claim 1, wherein said catalyst comprises a free radical generating component.

5. The grouting system of claim 4, wherein said free radical generating component comprises benzoyl peroxide.

6. The grouting system of claim 2, wherein said inhibitor comprises a free radical inactivating component.

7. The grouting system of claim 6, wherein said inhibitor comprises at least one of napthoquinone and hydroquinone.

8. The grouting system of claim 1, wherein said carbon component comprises carbon black, amorphous carbon and/or graphitic carbon.

9. A method of controlling gel time of a grouting system comprising:
   providing (a) a resin component, (b) a catalyst component separated from the resin component; and
   adding a carbon component to the catalyst component,
   wherein the carbon component to catalyst ratio is about 0.1-1 to 1000 by weight in the catalyst component.

10. The method of claim 9, wherein the resin component further comprises a promoter.

11. The method of claim 9, wherein the carbon component is added in an amount whereby the gel time of the grouting system is substantially stable.

12. The method of claim 9, wherein the carbon component is added in an amount whereby the gel time of the grouting system is substantially increased.

13. The method of claim 9, wherein the carbon component is added in an amount whereby the gel time of the grouting system is substantially decreased.

14. The method of claim 9, wherein the catalyst comprises a free radical generating component.

15. The method of claim 14, wherein the catalyst component comprises an inhibitor comprising a free radical inactivating component.

16. A method of stabilizing the gel time of a resin catalyst grouting system comprising a resin component separated from a catalyst component, wherein the catalyst component comprises (i) a peroxide catalyst that generates free radicals, and (ii) an inhibitor that inactivates free radicals generated by the peroxide catalyst, the improvement comprising:
   the catalyst component further comprising a stabilizer capable of further inactivating free radicals generated by the catalyst,
   wherein the stabilizer comprises a carbon component, and
   wherein the carbon component to catalyst ratio is about 0.1-1 to 1000 by weight in the catalyst component.

17. The method of claim 16, wherein the resin comprises a promoter of catalytic activity of the catalyst.

18. The method of claim 17, wherein the promoter comprises an aniline promoter.

19. The method of claim 16, wherein the inhibitor comprises a phenolic compound.

* * * * *

UNITED STATES PATENT AND TRADEMARK OFFICE
CERTIFICATE OF CORRECTION

PATENT NO. : 8,444,350 B2
APPLICATION NO. : 12/917727
DATED : May 21, 2013
INVENTOR(S) : Richard Wharton et al.

Page 1 of 1

It is certified that error appears in the above-identified patent and that said Letters Patent is hereby corrected as shown below:

In the Claims

Column 5, Line 23, Claim 7, delete "napthoquinone" and insert -- naphthoquinone --

Signed and Sealed this
First Day of October, 2013

Teresa Stanek Rea
*Deputy Director of the United States Patent and Trademark Office*